G. S. DEANE.
Gage Wheel for Plows.

No. 78,934.  
Patented June 16, 1868.

WITNESSES  
W. C. Ashketter  
Wm. A. Morgan

INVENTOR  
G S Deane  
by Munny & Co  
Attorneys

United States Patent Office.

GAIUS S. DEANE, OF GRAND RAPIDS, MICHIGAN.

Letters Patent No. 78,934, dated June 16, 1868.

IMPROVEMENT IN GAUGE-WHEELS FOR PLOWS.

The Schedule referred to in these Letters Patent and making part of the same.

TO ALL WHOM IT MAY CONCERN:

Be it known that I, GAIUS S. DEANE, of Grand Rapids, in the county of Kent, and State of Michigan, have invented a new and useful Improvement in Gauge-Wheel for Plows; and I do hereby declare that the following is a full, clear, and exact description thereof, which will enable others skilled in the art to make and use the same, reference being had to the accompanying drawings, forming part of this specification Figure 1 is a side view of my improved plow-wheel.

Figure 1:
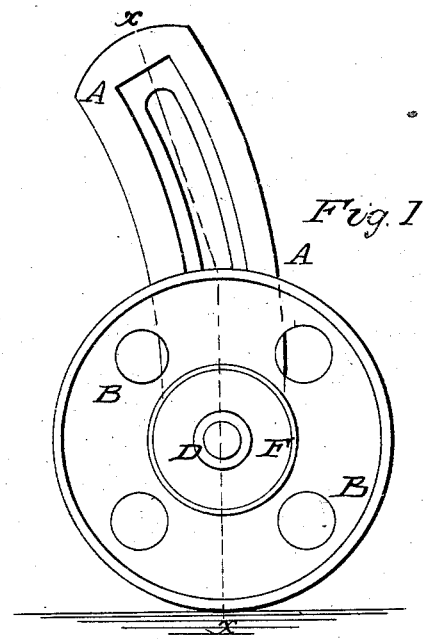
Figure 2:
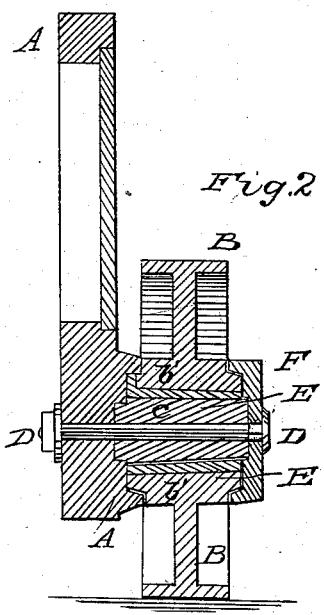

Figure 2 is a detail sectional view of the same, taken through the line $x$ $x$, fig. 1.

Similar letters of reference indicate corresponding parts.

My invention has for its object to furnish an improved gauge-wheel for plows, which shall be strong and durable, and which shall be so constructed that the parts most subject to wear may be readily detached and removed, when worn, and replaced with new ones at a trifling expense; and it consists in the construction and combination of the various parts of the hub and axle, as hereinafter more fully described.

A is the standard, and B is the wheel, both of which are made of cast iron. C is the axle, which is made separate from the standard A. The axle C is made hollow, and is made to fit closely upon the bolt D, by which it is secured to the standard A. The bore of the hub, $b'$, of the wheel B is made large to receive the false hub E, which fits into the said hub, and is kept from revolving in its place by having a lug formed upon its outer side, and fitting into a recess formed for its reception in the said hub $b'$. F is a cap, fitting upon the outer end of the hub and axle, and the inner side of which is recessed, so as to receive the said ends of the hub and axle, not only to hold the hub securely in place, but also to prevent the entrance of dust and dirt. The part of the standard A against which the ends of the hub and axle rest is also recessed to receive the said ends of the said hub and axle to support them, and also to prevent the entrance of dirt. The hollow axle C is made longer than the hub $b'$, and its ends fit into the central parts of the recesses in the standard A and cap F, which are deepened to receive them. The said hollow axle C is also made longer than the hub $b'$, so that while the axle C is securely clamped in place the hub may be free to revolve.

It should be observed that the hollow axle C fits so closely upon the bolt D, and is so firmly clamped between the standard A and cap F that it cannot turn with the revolution of the wheel.

By this construction, when the lower side of the hollow axle C becomes worn, the bolt D may be loosened, and the said axle C turned half around, so that the wear may come upon its other side, and when worn out it may be replaced with a new one at trifling expense. The false hub, E, when worn so as to become too loose, may also be easily removed and replaced with a new one, without its being necessary to go to the expense of buying an entire new wheel.

I claim as new, and desire to secure by Letters Patent—

1. The combination of a false hub, E, with the hub of a cast-iron plow-wheel, substantially as herein shown and described and for the purpose set forth.

2. The hollow axle C, secured to the standard A by a bolt, D, substantially as herein shown and described and for the purpose set forth.

3. The combination of the recessed standard A, bolt D, hollow axle C, cap F, removable false hub E, and cast-iron wheel B, with each other, said parts being constructed and arranged substantially as herein shown and described and for the purposes set forth.

GAIUS S. DEANE.

Witnesses:
T. SINCLAIR,
CHAS. H. DEANE.